Aug. 13, 1935.  W. T. JACOBS  2,010,860
TURNTABLE TYPE SIDE LOADING HEARSE
Filed Jan. 19, 1931
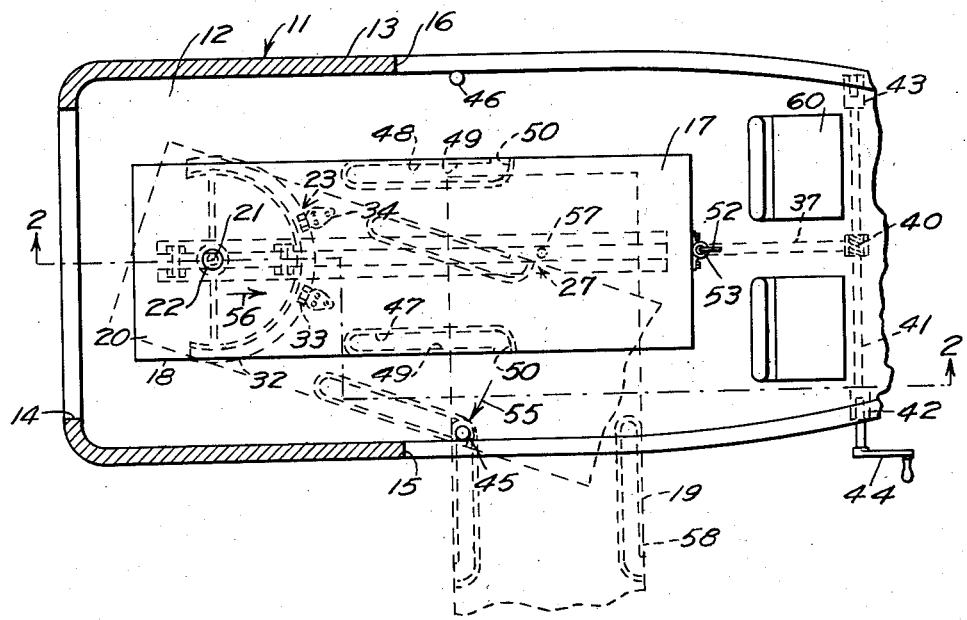
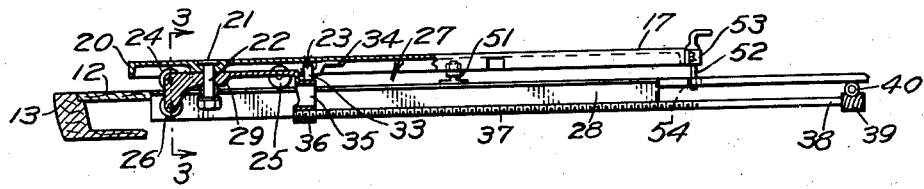
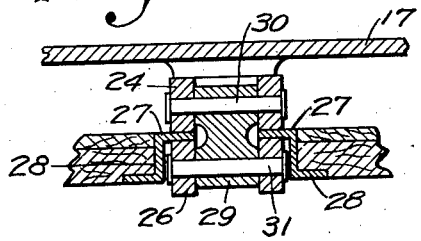
INVENTOR:
Walter T. Jacobs,
BY
ATTORNEY.

Patented Aug. 13, 1935

2,010,860

UNITED STATES PATENT OFFICE 2,010,860

TURNTABLE TYPE SIDE LOADING HEARSE

Walter T. Jacobs, Freeport, Ill., assignor, by mesne assignments, to Big Rock Ranch Company, Los Angeles, Calif., a corporation of California Application January 19, 1931, Serial No. 509,751

7 Claims. (Cl. 296—16)

This invention relates to vehicles such as hearses of the side loading type having a load receiving platform adapted to be swung from a position within the body of a vehicle to a position of lateral extension to facilitate the loading or unloading of the load receiving platform.

It is an object of the invention to provide a vehicle of the universal side loading type having an opening on each side thereof and being equipped with means whereby the load receiving platform may be projected either to the right or left side of the vehicle as the conditions of loading and unloading may require.

In the illustration of the invention the disclosure will be confined to hearses, it being understood that it may have equally valuable utility when used with vehicles intended for other purposes.

An object of the invention is to provide a pivot member and means for applying power to the pivot member so that it will move along a predetermined longitudinal path within the body of the vehicle, and to employ this pivot member as a means for turnably supporting a platform member, together with means for causing the platform member to move into a laterally extending position as the pivot member is moved from a position at one end of its path of movement to the other end thereof.

A further object of the invention is to provide a laterally swingable platform and pivot supporting means therefor which will permit the platform to be swung freely either to the right or left of the vehicle, whereupon such platform will project through a right-hand opening or left-hand opening provided in the side walls of the vehicle.

A further object of the invention is to provide cooperative guide means which may be selectively actuated to cause the projection of the platform either to the right or to the left of the vehicle when the pivot is moved forwardly within the vehicle as a result of the application of power thereto.

It is an object of the invention to provide a hearse which may be loaded from a multiplicity of positions. In the preferred embodiment of the invention right and left side openings are provided to enable the loading of the hearse from either side of the vehicle, and an opening is provided in the back of the vehicle, through which a casket may be loaded or unloaded.

Further objects and advantages will appear in the ensuing specification.

Referring to the drawing which is for illustrative purposes only,

Fig. 1 is a diagrammatic, partly sectioned plan view showing my invention applied to the body of a hearse.

Fig. 2 is a fragmentary partly sectioned elevational view corresponding to Fig. 1, the platform of the invention being shown in section substantially as indicated by the line 2—2 of Fig. 1.

Fig. 3 is an enlarged fragmentary cross section on a plane represented by the line 3—3 of Fig. 2, showing the longitudinal track member and the wheels of the pivot member engaging the track member.

In Fig. 1 I show a hearse body 11, having a floor 12 and a side wall structure 13, in which a rear opening 14 and right and left side openings 15 and 16 are formed. A load receiving platform 17 of a size to receive and support a burial casket is adapted to be held in the position shown in full lines 18 during the transportation of the casket from point to point and to be projected laterally through either of the side openings 15 or 16, as indicated by the dotted line 19 when it is desired to load thereon or remove therefrom the casket.

Supporting the rearward end 20 of the platform 17 is a pivot 21 which includes a vertical pivot pin 22 and a wheeled platform support 23 having upper pairs of wheels 24 and 25 and a lower pair of wheels 26, all of which wheels engage a track member 27 consisting, as shown in Figs. 2 and 3, of upper flanges of Z-bars 28 which are set into the floor 12 of the vehicle. The platform support 23 includes a central body 29 which is vertically drilled to receive the pivot pin 22 and at its rearward end carries axle pins 30 and 31 disposed above and below the plane of the flanges 27, the outer ends of the axle members 30 and 31 supporting the upper and lower pairs of wheels 24 and 26 in such positions that the upper wheels 24 will engage the upper surfaces of the flanges 27 and the lower wheels 26 will engage the under faces of the flanges 27.

The platform support 23 also includes a circular track 32 which is engaged by turntable rollers 33 supported on the under face of the table 17 by means of brackets 34. The pair of rollers or wheels 25 is situated forwardly with respect to the pivot pin 22 in a position to receive the down thrust of the weight of the platform 17 and of such loads as may be carried thereon. At the forward end of the platform support 23 a downwardly extending web 35 supports an internally threaded sleeve 36 which is engaged by a longitudinally extending screw 37 having means at its forward end 38 whereby the screw may be rotated and the pivot 21 caused to move along the path defined by the track provided by the member 27.

In the embodiment of the invention shown, the means for applying power to move the pivot 21 includes a worm gear 39 secured to the forward end 38 of the screw 37 and a worm 40 secured upon and rotated by a laterally extending shaft 41 having the rightward and leftward ends 42 and 43 thereof prepared for engagement by a wrench or crank 44 which may be employed manually to impart the necessary power for moving the pivot 21 either forwardly or rearwardly along its defined path of movement.

Means for guiding the platform 17 into proper position of lateral projection as the pivot 21 is moved forwardly are shown in the form of right and left rollers 45 and 46 which respectively engage right and left side grooves 47 and 48 formed on the lower face and near the sides of the platform 17. Each of the guide grooves 47 and 48 provides a guide channel 49 extending parallel to a side of the platform 17 and having a laterally directed entrance mouth or opening 50 through which a cooperating guide roller 45 or 46 may enter or leave its respective guide groove 47 or 48. The rollers 45 and 46 may be supported by vertical pins which project upwardly from the floor 12 of the body 11, as indicated at 51 in Fig. 2.

When it is desired to project the platform 17 through either the right or left side opening 15 or 16 a lock pin 52 supported by a bracket 53 at the forward end of the platform 17 is first raised from engagement with a recess 54 formed in the floor 12, as shown in Fig. 2, which operation renders the platform 17 freely swingable on the pivot 21, and the platform 17 is then swung either to the right or to the left of the pivot 21 until the mouth 50 of one of the guide grooves 47 or 48 engages a guide roller 45 or 46. Assuming that it is desired to project the platform through the side opening 15, the lock pin 52 is released and the platform 17 is then moved so as to cause the mouth 50 of the guide groove 47 to move in the direction of the arrow 55 toward an engagement with the guide roller 45.

With the mouth 50 and the guide roller 45 so engaged, the handle 44 may be applied to the end 42 of the lateral bar or shaft 41, and the screw 37 thereby rotated to cause the pivot 21 to move forwardly in the direction indicated by the arrow 56 toward and into the position indicated by the dotted line 57. Until the pivot 21 is moved forwardly in the direction of the arrow 56 the platform 17 is free to swing about the pivot 21 through a substantial arc. During the forward movement of the pivot 21 the engagement of the guide groove 47 with the roller 45 will cause the forward end 58 of the platform to move toward and into the laterally extending position indicated by dotted lines in Fig. 1, the guide groove moving outwardly on the roller 45 during the swinging movement of the paltform 17, with the result that when the platform 17 is in fully projected position the rearward end of the parallel channel portion 49 of the guide groove will coincide with the roller 45.

In swinging the platform 17 through the opening 15 or 16 it may be desired to swing the platform to a position other than the position indicated by the dotted line 57. To accomplish this the lock pin 52 is first released from engagement with the recess 54 in the floor 12, and the platform 17 is then swung either to the right or to the left of the pivot 21, but not far enough to cause the mouth 50 of one of the guide grooves 47 or 48 to engage one of the guide rollers 45 or 46. During the forward movement of the pivot 21 the guide groove 47 or 48 thus will not engage the guide roller 45 or 46, and the platform 17 will be free to rotate on the pivot during the longitudinal movement of the pivot and after the movement has ceased to a plurality of positions in which the platform projects through either of the openings 15 or 16.

During the swinging of the platform 17 on the pivot 21 the turntable rollers 33 roll in the required direction on the circular track 32, supporting the platform at all times regardless of whether the platform is in movement or at rest. It is evident that retraction of the table 17 from the extended position indicated by dotted lines in Fig. 1 to the enclosed position indicated by full lines in Fig. 1 is to be accomplished by reverse rotation of the screw 37 through proper application of the crank 44.

When the pivot 21 has moved to the rear end of its travel, the guide roller 45 will be coincident with the mouth 50 of the guide groove 47. The platform 17 may then be swung into longitudinally centralized position and the latch pin 52 brought into engagement with the latch opening 54, the side doors of the vehicle then being closed and the vehicle then being operated by an attendant occupying a driver's seat 60 situated within the vehicle body 12 forward of the platform 17, as indicated in Fig. 1.

I have shown herein a simple and practical form of my invention, but it is recognized that certain parts or elements thereof are representative of other parts, elements, or mechanisms which may be employed in substantially the same manner to accomplish substantially the same results; therefore, it is not intended that the invention shall be limited to the details disclosed herein but shall have the scope of the following claims.

I claim as my invention:

1. A hearse of the character described having a body with a doorway in the side thereof and a platform disposable longitudinally in said body and extensible through said doorway, characterized by: a platform support supported on a track carried by said body; and means to prevent tilting of said platform support, said platform being pivoted to and wholly supported by said platform support.

2. A hearse of the character described having a body with a doorway in the side thereof and a platform disposable longitudinally in said body and extensible through said doorway, characterized by: tracks carried by said body; a platform support adapted to wholly support said platform carried by wheels running on said tracks and arranged to prevent tilting of said support; and a pivot between said platform support and said platform.

3. A hearse of the character described having a body with a doorway in the side thereof and a platform disposable longitudinally in said body and extensible through said doorway, characterized by: tracks carried by said body; a platform support carried by wheels running on said tracks and arranged to prevent tilting of said support; a circular track carried by said platform support in such a position as to receive a portion of the weight of said platform; and a pivot between said platform support and said platform.

4. A hearse of the character described having a body with a doorway in the side thereof and a platform disposable longitudinally in said body and extensible through said doorway, characterized by: tracks carried by said body; a platform support carried by wheels running on said tracks and arranged to prevent tilting of said support; a circular track carried by said platform support in such a position as to receive a portion of the weight of said platform; and a pivot between said platform support and said platform, said pivot being so constructed as to resist any upward movement of said platform at the pivot point.

5. In a hearse, the combination of: a body having a doorway in the side thereof; a track carried by said body; a platform support comprising wheels adapted to run on said track and having a semi-circular supporting track; a pivot associated with said platform support; a platform adapted to freely rotate to a position where a portion thereof projects through the doorway about said pivot on said supporting track; means for moving said platform support longitudinally in said body; and means for arresting the free rotation of said platform about said pivot and adapted to guide said platform through said doorway.

6. In a hearse, the combination of: a body having a doorway in the side thereof; a track carried by said body; a platform support comprising wheels adapted to run on said track and having a semi-circular supporting track; a pivot associated with said platform support; a platform adapted to freely rotate through a substantial arc about said pivot on said supporting track, said platform having a groove therein open at one end; means for moving said platform longitudinally in said body; a guide member associated with said body in such a way that it can enter the open end of said groove and during the longitudinal movement of said platform in said body, arrest the free rotation of said platform about said pivot, and guide said platform through said doorway.

7. A hearse of the character described having a body with a doorway in the side thereof and a platform disposable longitudinally in said body and extendable through said doorway, said platform being characterized by: a pivot movable longitudinally of said body; and walls forming a groove having an opening in one end thereof, said body having a guide member near the doorway adapted to enter said groove through said opening and thereafter to guide said platform, said platform being freely rotatable about said pivot to bring the free end into the doorway and said guide member into said groove.

WALTER T. JACOBS.